US012810799B2

(12) United States Patent
Jin et al.

(10) Patent No.: US 12,810,799 B2
(45) Date of Patent: Nov. 24, 2026

(54) PIXEL CIRCUIT, DISPLAY DEVICE INCLUDING THE PIXEL CIRCUIT, AND ELECTRONIC APPARATUS INCLUDING THE DISPLAY DEVICE

(71) Applicant: Samsung Display Co., LTD., Yongin-si (KR)

(72) Inventors: Jongwoo Jin, Yongin-si (KR); Kihwan Kim, Yongin-si (KR); Jun Hyung Lim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/237,739

(22) Filed: Jun. 13, 2025

(65) Prior Publication Data

US 2026/0087985 A1 Mar. 26, 2026

(30) Foreign Application Priority Data

Sep. 26, 2024 (KR) ........................ 10-2024-0130905

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0408* (2013.01); *G09G 2300/0814* (2013.01); *G09G 2300/0842* (2013.01); *G09G 2300/0861* (2013.01); *G09G 2320/0686* (2013.01); *G09G 2330/023* (2013.01)

(58) Field of Classification Search
CPC ............... G09G 3/3233; G09G 3/2007; G09G 2300/0408; G09G 2300/0814; G09G 2300/0842; G09G 2300/0861; G09G 2320/0686
See application file for complete search history.

(56) References Cited

U.S. PATENT DOCUMENTS

2016/0042694 A1* 2/2016 Lim ..................... G09G 3/3233 345/78
2020/0302860 A1* 9/2020 Kim ........................ G09G 3/325
2022/0093035 A1* 3/2022 Watsuda .............. G09G 3/3208

FOREIGN PATENT DOCUMENTS

KR 102151751 B1 8/2020

* cited by examiner

*Primary Examiner* — Lisa S Landis
(74) *Attorney, Agent, or Firm* — CANTOR COLBURN LLP

(57) ABSTRACT

A pixel circuit includes a light-emitting element connected between a first power line and a second power line, a first driving transistor connected between the first power line and the light-emitting element, and a second driving transistor connected between the first power line and the light-emitting element. An emission current flowing through the light-emitting element is a first driving current flowing through the first driving transistor, a second driving current flowing through the second driving transistor, or a sum of the first driving current and the second driving current.

20 Claims, 16 Drawing Sheets

PIXEL CIRCUIT, DISPLAY DEVICE INCLUDING THE PIXEL CIRCUIT, AND ELECTRONIC APPARATUS INCLUDING THE DISPLAY DEVICE

This application claims priority to Korean Patent Application No. 10-2024-0130905, filed on Sep. 26, 2024, and all the benefits accruing therefrom under 35 U.S.C. § 119, the content of which in its entirety is herein incorporated by reference.

BACKGROUND

1. Field

Embodiments relate to a display device. More particularly, embodiments relate to a pixel circuit which emits with a luminance corresponding to a data voltage, a display device including the pixel circuit, and an electronic apparatus including the display device.

2. Description of the Related Art

A display device may include a plurality of pixel circuits that display an image based on data voltages. Each of the pixel circuits may include a driving transistor that generates a driving current corresponding to the data voltage and a light-emitting element that emits light with a luminance corresponding to the driving current.

When a driving range of the driving transistor is narrow, power consumption of the pixel circuit may be reduced at a high luminance, but detailed grayscale expression may be difficult at a low luminance. Further, when the driving range of the driving transistor is wide, the detailed grayscale expression may be possible at the low luminance, but the power consumption of the pixel circuit may increase at the high luminance.

SUMMARY

Embodiments provide a pixel circuit that enables detailed grayscale expression and reduces power consumption, a display device including the pixel circuit, and an electronic apparatus including the display device.

A pixel circuit according to embodiments includes a light-emitting element connected between a first power line and a second power line, a first driving transistor connected between the first power line and the light-emitting element, and a second driving transistor connected between the first power line and the light-emitting element. In such embodiments, an emission current flowing through the light-emitting element is a first driving current flowing through the first driving transistor, a second driving current flowing through the second driving transistor, or a sum of the first driving current and the second driving current.

In an embodiment, a first one of the first and second driving transistors may include only one gate, and a second one of the first and second driving transistors may include two gates.

In an embodiment, each of the first and second driving transistors may include a first gate and a second gate. In such an embodiment, a data voltage may be applied to the first gate of each of the first and second driving transistors. In such an embodiment, the second gate of the first driving transistor may be connected to a source of the first driving transistor, and the second gate of the second driving transistor may be connected to the first gate of the second driving transistor.

In an embodiment, the pixel circuit may further include a first emission control transistor connected between the first power line and the first driving transistor, and turned on in response to a first emission signal, and a second emission control transistor connected between the first power line and the second driving transistor, and turned on in response to a second emission signal.

In an embodiment, the pixel circuit may further include a first emission control transistor connected between the first driving transistor and the light-emitting element, where the first emission control transistor may be turned on in response to a first emission signal, and a second emission control transistor connected between the second driving transistor and the light-emitting element, where the second emission transistor may be turned on in response to a second emission signal.

In an embodiment, the pixel circuit may further include a storage capacitor including a terminal connected to a first node, and a scan transistor connected between a data line and the first node, where the scan transistor may be turned on in response to a scan signal.

In an embodiment, the pixel circuit may further include a second connection transistor connected between the first node and a gate of the second driving transistor, where the second connection transistor may be turned on in response to a second selection signal.

In an embodiment, the pixel circuit may further include a first connection transistor connected between the first node and a gate of the first driving transistor, where the first connection transistor may be turned on in response to a first selection signal.

In an embodiment, the pixel circuit may further include a substrate, a first active pattern on the substrate, where the first active pattern may extend in a first direction in a plan view, a second active pattern in a same layer as the first active pattern, where the second active pattern may extend in the first direction in the plan view, and an upper gate pattern on the first active pattern and the second active pattern. In such an embodiment, the first driving transistor may include the first active pattern and a first portion of the upper gate pattern which overlaps the first active pattern, and the second driving transistor may include the second active pattern and a second portion of the upper gate pattern which overlaps the second active pattern.

In an embodiment, a length of the first active pattern in the first direction may be different from a length of the second active pattern in the first direction.

In an embodiment, a width of the first active pattern in a second direction intersecting the first direction may be different from a width of the second active pattern in the second direction.

In an embodiment, a semiconductor material of the first active pattern may be different from a semiconductor material of the second active pattern.

In an embodiment, the pixel circuit may further include a gate insulation layer between the first active pattern and the upper gate pattern and between the second active pattern and the upper gate pattern. In such an embodiment, a thickness of a first portion of the gate insulation layer which is positioned between the first active pattern and the upper gate pattern may be different from a thickness of a second portion of the gate insulation layer which is positioned between the second active pattern and the upper gate pattern.

In an embodiment, the pixel circuit may further include a buffer layer between the substrate and the first active pattern and between the substrate and the second active pattern. In such an embodiment, the first driving transistor may further include a first lower gate between the substrate and buffer layer and overlapping the first active pattern, and the second driving transistor may further include a second lower gate between the substrate and buffer layer and overlapping the second active pattern.

In an embodiment, a thickness of a first portion of the buffer layer positioned between the first lower gate and the first active pattern may be different from a thickness of a second portion of the buffer layer positioned between the second lower gate and the second active pattern.

In an embodiment, the first lower gate and the second lower gate may be integrally formed with each other as a single unitary indivisible part.

In an embodiment, the pixel circuit may further include a conductive pattern on the upper gate pattern, where the conductive pattern may be connected to a terminal of the first active pattern and a terminal of the second active pattern. In such an embodiment, the upper gate pattern and the conductive pattern may collectively define a storage capacitor.

A display device according to embodiments includes a display panel including a plurality of pixel circuits positioned in a display area, and a panel driver which drives the display panel. In such embodiments, each of the pixel circuits includes a light-emitting element connected between a first power line and a second power line, a first driving transistor connected between the first power line and the light-emitting element, and a second driving transistor connected between the first power line and the light-emitting element. In such embodiments, an emission current flowing through the light-emitting element is a first driving current flowing through the first driving transistor, a second driving current flowing through the second driving transistor, or a sum of the first driving current and the second driving current.

In an embodiment, the emission current of a pixel circuit positioned in a first area of the display area among the pixel circuits may be the first driving current. In such an embodiment, the emission current of a pixel circuit positioned in a second area of the display area among the pixel circuits may be the second driving current or the sum of the first driving current and the second driving current.

An electronic apparatus according to embodiments includes a processor which generates image data, and a display device which displays an image based on the image data. The display device includes a display panel including a plurality of pixel circuits positioned in a display area, and a panel driver which drives the display panel. In such embodiments, each of the pixel circuits includes a light-emitting element connected between a first power line and a second power line, a first driving transistor connected between the first power line and the light-emitting element, and a second driving transistor connected between the first power line and the light-emitting element. In such embodiments, an emission current flowing through the light-emitting element is a first driving current flowing through the first driving transistor, a second driving current flowing through the second driving transistor, or a sum of the first driving current and the second driving current.

In the pixel circuit, the display device, and the electronic apparatus according to embodiments, the first driving current flowing through the first driving transistor flows through the light-emitting element in a normal luminance mode, such that detailed grayscale expression may be enabled in a low luminance. In such embodiments, the second driving current flowing through the second driving transistor or the sum of the first driving current and the second driving current flows through the light-emitting element in a high luminance mode, such that power consumption may be reduced in a high luminance.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
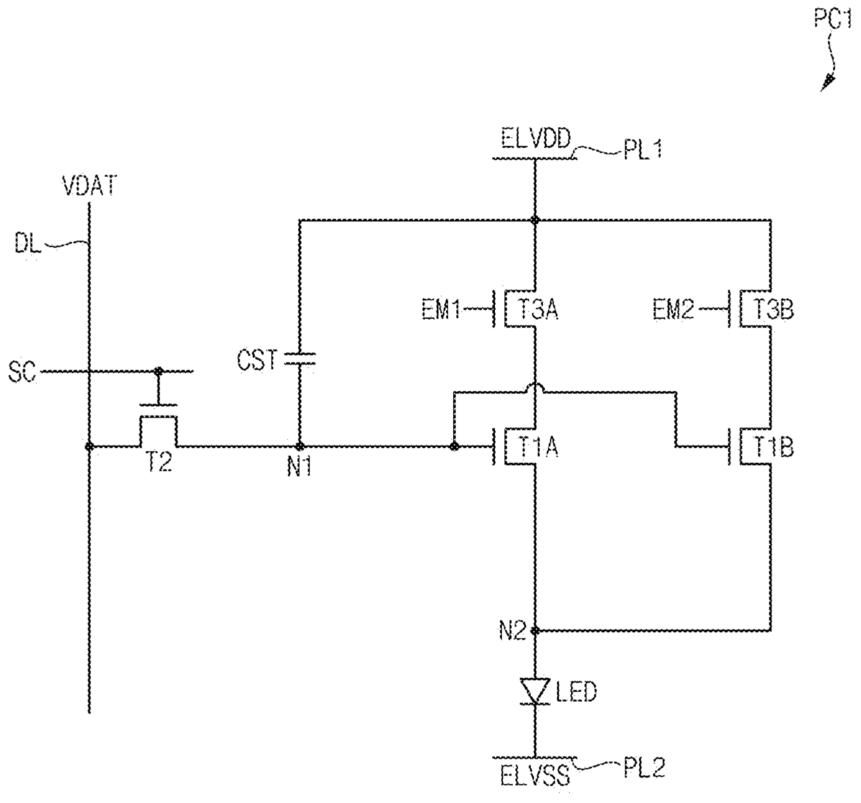
FIG. 1 is a circuit diagram illustrating a pixel circuit according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a pixel circuit, a display device, and an electronic apparatus according to embodiments of the present disclosure will be described in greater detail with reference to the accompanying drawings. The same or similar reference numerals will be used for the same elements in the accompanying drawings.

FIG. 1 is a circuit diagram illustrating a pixel circuit PC1 according to an embodiment.

Referring to FIG. 1, an embodiment of the pixel circuit PC1 may include a light-emitting element LED, a first driving transistor T1A, a second driving transistor T1B, a storage capacitor CST, a scan transistor T2, a first emission control transistor T3A, and a second emission control transistor T3B.

The light-emitting element LED may be connected between a first power line PL1 and a second power line PL2. The first power line PL1 may transmit a first power voltage ELVDD, and the second power line PL2 may transmit a second power voltage ELVSS. A level (i.e., a voltage level) of the first power voltage ELVDD may be higher than a level of the second power voltage ELVSS.

The light-emitting element LED may include an anode connected to a second node N2 and a cathode connected to the second power line PL2. The light-emitting element LED may emit light with a luminance corresponding to an emission current flowing through the light-emitting element LED. In an embodiment, the light-emitting element LED may be an organic light-emitting diode, an inorganic light-emitting diode, a micro light-emitting diode, or a quantum dot light-emitting diode.

The first driving transistor T1A may be connected between the first power line PL1 and the light-emitting element LED. The second driving transistor T1B may be connected between the first power line PL1 and the light-emitting element LED.

In an embodiment, each of the first and second driving transistors T1A and TiB may include only one gate. In such an embodiment, each of the first and second driving transistors T1A and TiB may have a single gate structure.

The first driving transistor T1A may include a gate connected to a first node N1, a drain connected to a source of the first emission control transistor T3A, and a source connected to the second node N2. The second driving transistor T1B may include a gate connected to the first node N1, a drain connected to a source of the second emission control transistor T3B, and a source connected to the second node N2.

A driving range of the first driving transistor T1A may be wider than a driving range of the second driving transistor T1B. A driving range of a transistor may be a range of a gate-source voltage of the transistor corresponding to a certain range of a current flowing through the transistor (for example, about 10 picoampere (pA) to about 10 nanoampere (nA)). In such an embodiment where the driving range of the driving transistor is wide, the current flowing through the driving transistor may be controlled more precisely, and accordingly, a luminance of light emitted by the light-emitting element may be controlled more precisely.

An on-current of the second driving transistor T1B may be greater than an on-current of the first driving transistor T1A. An on-current of a transistor may be a current flowing through the transistor when a gate-on voltage is applied to a gate of the transistor. In such an embodiment where the on-current of the driving transistor is large, even if a same data voltage is applied to the gate of the driving transistor, a larger current may flow through the driving transistor, and accordingly, power consumption of the pixel circuit PC1 may be reduced.

The storage capacitor CST may have a terminal connected to the first node N1. The storage capacitor CST may include a first terminal connected to the first node N1 and a second terminal connected to the first power line PL1.

The scan transistor T2 may be connected between a data line DL and the first node N1, and may be turned on in response to a scan signal SC. The scan transistor T2 may include a gate that receives the scan signal SC, a drain connected to the data line DL, and a source connected to the first node N1.

The first emission control transistor T3A may be connected between the first power line PL1 and the first driving transistor T1A, and may be turned on in response to a first emission signal EM1. The first emission control transistor T3A may include a gate that receives the first emission signal EM1, a drain connected to the first power line PL1, and a source connected to the drain of the first driving transistor T1A.

The second emission control transistor T3B may be connected between the first power line PL1 and the second driving transistor T1B, and may be turned on in response to a second emission signal EM2. The second emission control transistor T3B may include a gate that receives the second emission signal EM2, a drain connected to the first power line PL1, and a source connected to the drain of the second driving transistor T1B.

The emission current flowing through the light-emitting element LED may be a first driving current flowing through the first driving transistor T1A, a second driving current flowing through the second driving transistor T1B, or the sum of the first driving current and the second driving current.

In an emission period of the pixel circuit PC1, when the first emission signal EM1 has an activation level (e.g., a logic high level) and the second emission signal EM2 has a deactivation level (e.g., a logic low level), a current path may be formed from the first power line PL1 to the second power line PL2 through the first driving transistor T1A, and the emission current flowing through the light-emitting element LED may be the first driving current flowing through the first driving transistor T1A.

In the emission period of the pixel circuit PC1, when the first emission signal EM1 has the deactivated level and the second emission signal EM2 has the activated level, a current path may be formed from the first power line PL1 to the second power line PL2 through the second driving transistor T1B, and the emission current flowing through the light-emitting element LED may be the second driving current flowing through the second driving transistor T1B.

In the emission period of the pixel circuit PC1, when the first emission signal EM1 has the activated level and the second emission signal EM2 has the activated level, a current path may be formed from the first power line PL1 to the second power line PL2 through the first driving transistor T1A and through the second driving transistor T1B, and the emission current flowing through the light-emitting element LED may be the sum of the first driving current flowing through the first driving transistor T1A and the second driving current flowing through the second driving transistor T1B.

In an embodiment, when the pixel circuit PC1 is driven in a normal luminance mode, the emission current flowing through the light-emitting element LED may be the first driving current flowing through the first driving transistor T1A. Since the first driving current flowing through the first driving transistor T1A having a wide driving range is the emission current flowing through the light-emitting element LED in the normal luminance mode, a luminance of light emitted by the light-emitting element LED in the normal luminance mode may be controlled more precisely.

In an embodiment, when the pixel circuit PC1 is driven in a high luminance mode, the emission current flowing through the light-emitting element LED may be the second driving current flowing through the second driving transistor T2A or the sum of the first driving current flowing through the first driving transistor T1A and the second driving current flowing through the second driving transistor T1B. Since the second driving current flowing through the second driving transistor T1B having a large on-current or the sum of the first driving current and the second driving current is the emission current flowing through the light-emitting element LED in the high luminance mode, power consumption of the pixel circuit PC1 in the high luminance mode may be reduced.

Figure 2:
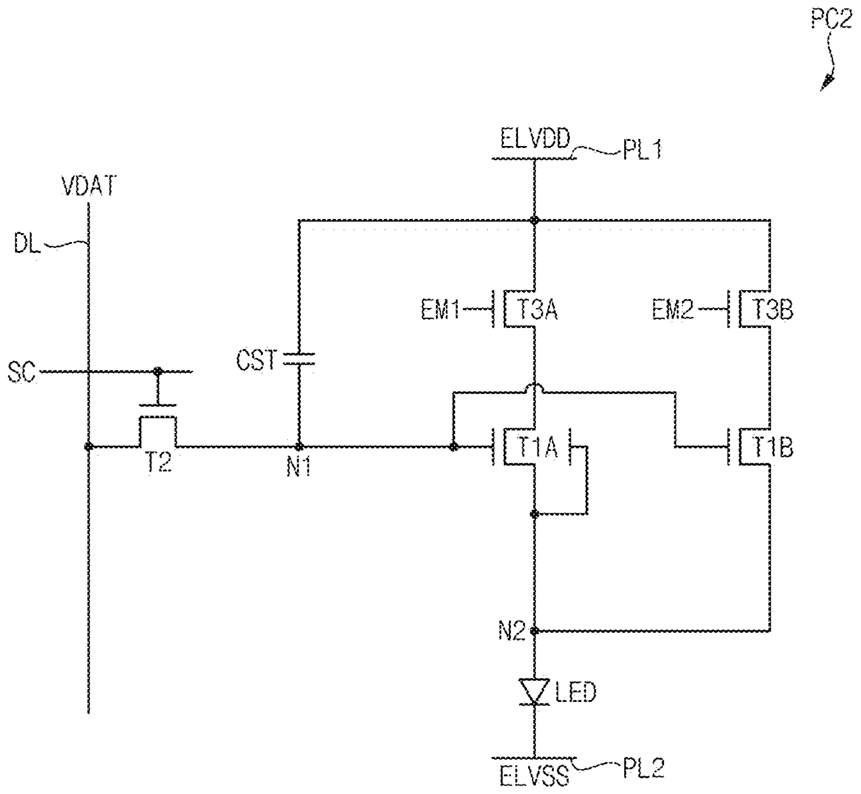
FIG. 2 is a circuit diagram illustrating a pixel circuit according to an embodiment.
Figure 3:
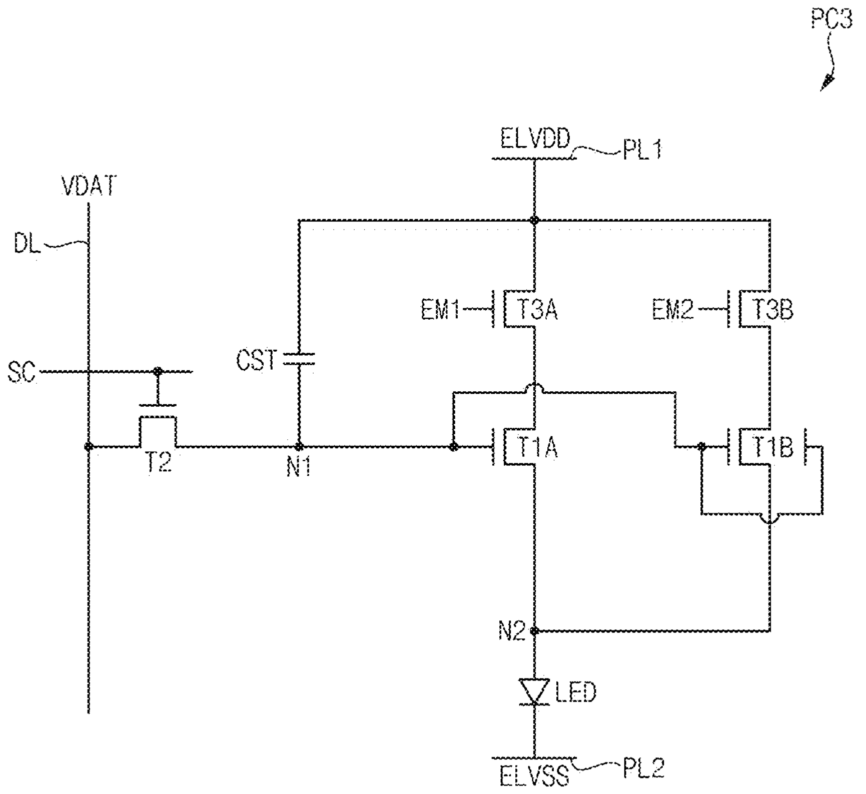
FIG. 3 is a circuit diagram illustrating a pixel circuit according to an embodiment.

FIG. 2 is a circuit diagram illustrating a pixel circuit PC2 according to an embodiment. FIG. 3 is a circuit diagram illustrating a pixel circuit PC3 according to an embodiment.

For convenience of description, any repetitive detailed descriptions of the same or like components of the pixel circuits PC2 and PC3 shown in FIGS. 2 and 3, which are substantially the same as or similar to those of the pixel circuit PC1 described above with reference to FIG. 1, will be omitted or simplified.

Referring to FIGS. 2 and 3, in an embodiment, a first one of the first and second driving transistors T1A and T1B may include only one gate, and a second one of the first and second driving transistors T1A and T1B may include two gates. In such an embodiment, the first one of the first and second driving transistors T1A and TiB may have a single gate structure, and the second one of the first and second driving transistors T1A and TiB may have a dual gate structure.

In an embodiment, as illustrated in FIG. 2, the first driving transistor T1A may include two gates, and the second driving transistor T1B may include only one gate. The first driving transistor T1A may include a first gate connected to the first node N1, a second gate connected to the second node N2, a drain connected to the source of the first emission control transistor T3A, and a source connected to the second node N2. The second gate of the first driving transistor T1A may be synchronized to the source of the first driving transistor T1A. In such an embodiment where a second gate of a transistor is synchronized to a source of the transistor, a driving range of the transistor may increase. Accordingly, the first driving transistor T1A may have a relatively wide driving range.

In an embodiment, as illustrated in FIG. 3, the first driving transistor T1A may include only one gate, and the second driving transistor T1B may include two gates. The second driving transistor T1B may include a first gate connected to the first node N1, a second gate connected to the first node N1, a drain connected to the source of the second emission control transistor T3B, and a source connected to the second node N2. The second gate of the second driving transistor T1B may be synchronized to the first gate of the second driving transistor T1B. In such an embodiment where a second gate of a transistor is synchronized to a first gate of the transistor, an on-current of the transistor may increase. Accordingly, the second driving transistor T1B may have a relatively large on-current.

Figure 4:
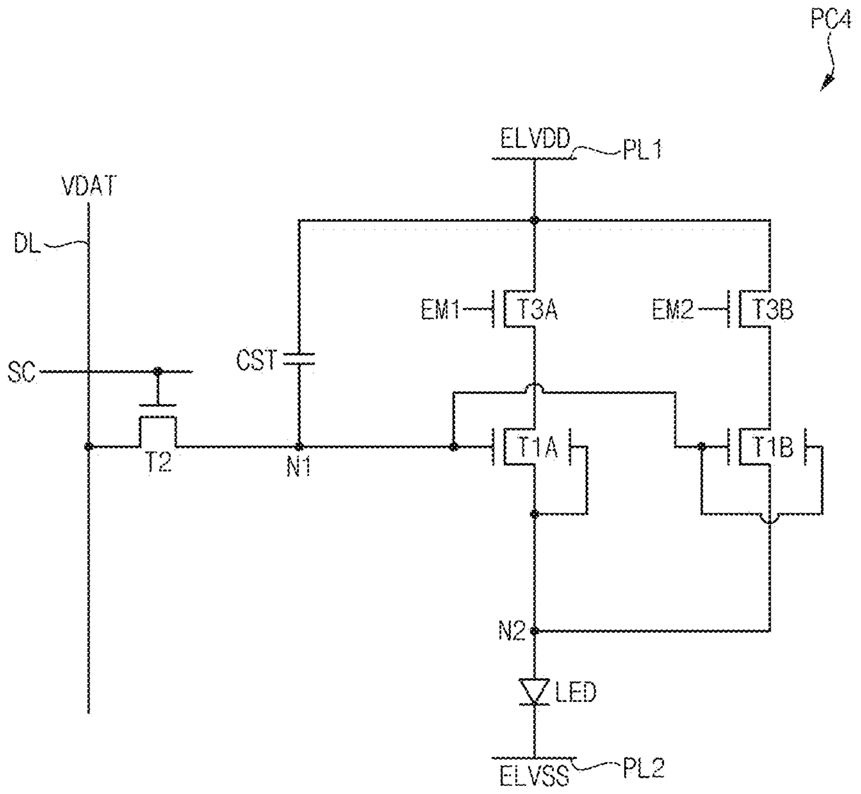
FIG. 4 is a circuit diagram illustrating a pixel circuit according to an embodiment.
Figure 5:
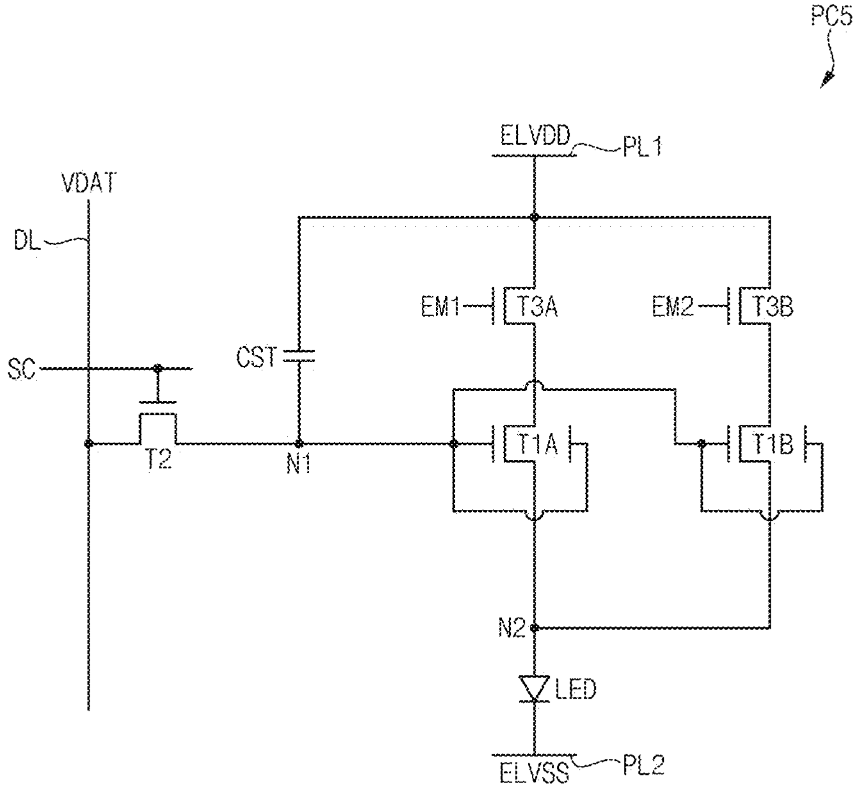
FIG. 5 is a circuit diagram illustrating a pixel circuit according to an embodiment.

FIG. 4 is a circuit diagram illustrating a pixel circuit PC4 according to an embodiment. FIG. 5 is a circuit diagram illustrating a pixel circuit PC5 according to an embodiment.

For convenience of description, any repetitive detailed descriptions of the same or like components of the pixel circuits PC4 and PC5 shown in FIGS. 4 and 5, which are substantially the same as or similar to those of the pixel circuits PC1, PC2, and PC3 described above with reference to FIGS. 1 to 3, will be omitted or simplified.

Referring to FIGS. 4 and 5, in an embodiment, the first driving transistor T1A may include two gates, and the second driving transistor T1B may include two gates. In such an embodiment, each of the first and second driving transistors T1A and T1B may have a dual gate structure.

In an embodiment, as illustrated in FIG. 4, the first driving transistor T1A may include a first gate connected to the first node N1, a second gate connected to the second node N2, a drain connected to the source of the first emission control transistor T3A, and a source connected to the second node N2. The second gate of the first driving transistor T1A may be synchronized to the source of the first driving transistor T1A.

In an embodiment, as illustrated in FIG. 5, the first driving transistor T1A may include a first gate connected to the first node N1, a second gate connected to the first node N1, a drain connected to the source of the first emission control transistor T3A, and a source connected to the second node N2. The second gate of the first driving transistor T1A may be synchronized to the first gate of the first driving transistor T1A.

The second driving transistor T1B may include a first gate connected to the first node N1, a second gate connected to the first node N1, a drain connected to the source of the second emission control transistor T3B, and a source connected to the second node N2. The second gate of the second driving transistor T1B may be synchronized with the first gate of the second driving transistor T1B.

Figure 6:
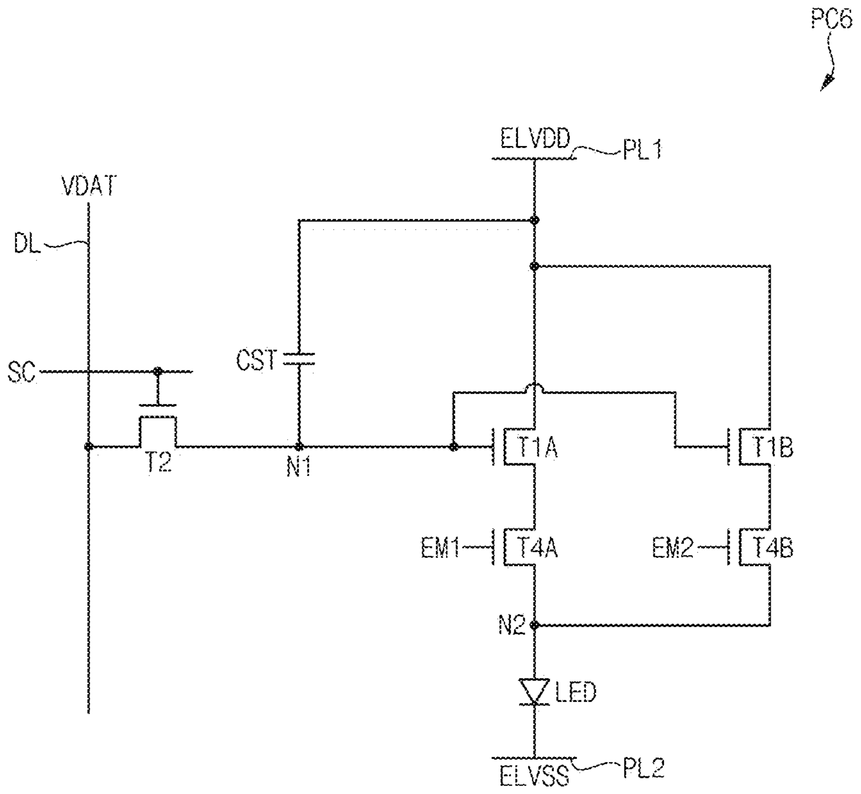
FIG. 6 is a circuit diagram illustrating a pixel circuit according to an embodiment.

FIG. 6 is a circuit diagram illustrating a pixel circuit PC6 according to an embodiment.

For convenience of description, any repetitive detailed descriptions of the same or like components of the pixel circuit PC6 shown in FIG. 6, which are substantially the same as or similar to those of the pixel circuit PC1 described above with reference to FIG. 1, will be omitted or simplified.

Referring to FIG. 6, an embodiment of the pixel circuit PC6 may include a light-emitting element LED, a first driving transistor T1A, a second driving transistor T1B, a storage capacitor CST, a scan transistor T2, a first emission control transistor T4A, and a second emission control transistor T4B.

The first driving transistor T1A may include a gate connected to a first node N1, a drain connected to a first power line PL1, and a source connected to a drain of the first emission control transistor T4A. The second driving transistor T1B may include a gate connected to the first node N1, a drain connected to the first power line PL1, and a source connected to a drain of the second emission control transistor T4B.

The first emission control transistor T4A may be connected between the first driving transistor T1A and the light-emitting element LED, and may be turned on in response to a first emission signal EM1. The first emission control transistor T4A may include a gate that receives the first emission signal EM1, a drain connected to the source of the first driving transistor T1A, and a source connected to a second node N2.

The second emission control transistor T4B may be connected between the second driving transistor T1B and the light-emitting element LED, and may be turned on in response to a second emission signal EM2. The second emission control transistor T4B may include a gate that receives the second emission signal EM2, a drain connected to the source of the second driving transistor T1B, and a source connected to the second node N2.

Figure 7:
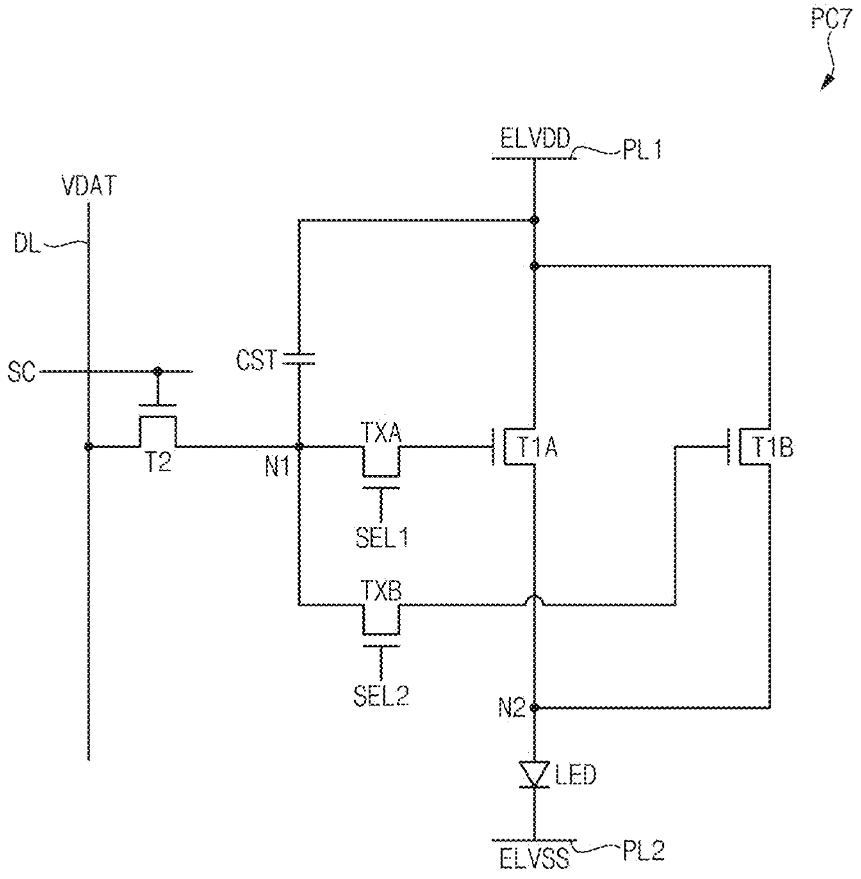
FIG. 7 is a circuit diagram illustrating a pixel circuit according to an embodiment.

FIG. 7 is a circuit diagram illustrating a pixel circuit PC7 according to an embodiment.

For convenience of description, any repetitive detailed descriptions of the same or like components of the pixel circuit PC7 shown in FIG. 7, which are substantially the same as or similar to those of the pixel circuit PC1 described above with reference to FIG. 1, will be omitted or simplified.

Referring to FIG. 7, an embodiment of the pixel circuit PC7 may include a light-emitting element LED, a first driving transistor T1A, a second driving transistor T1B, a storage capacitor CST, a scan transistor T2, a first connection transistor TXA, and a second connection transistor TXB.

The first driving transistor T1A may include a gate connected to a source of the first connection transistor TXA, a drain connected to a first power line PL1, and a source connected to a second node N2. The second driving transistor T1B may include a gate connected to a source of the second connection transistor TXB, a drain connected to the first power line PL1, and a source connected to the second node N2.

The first connection transistor TXA may be connected between a first node N1 and the gate of the first driving transistor T1A, and may be turned on in response to a first selection signal SEL1. The first connection transistor TXA may include a gate that receives the first selection signal SEL1, a drain connected to the first node N1, and a source connected to the gate of the first driving transistor T1A.

The second connection transistor TXB may be connected between the first node N1 and the gate of the second driving transistor T1B, and may be turned on in response to a second selection signal SEL2. The second connection transistor TXB may include a gate that receives the second selection signal SEL2, a drain connected to the first node N1, and a source connected to the gate of the second driving transistor T1B.

In a data writing period of the pixel circuit PC7, when the first selection signal SEL1 has an activation level (e.g., a logic high level) and the second selection signal SEL2 has a deactivation level (e.g., a logic low level), a data voltage VDAT may be written to the gate of the first driving transistor T1A, a current path may be formed from the first power line PL1 to a second power line PL2 through the first driving transistor T1A, and an emission current flowing through the light-emitting element LED may be a first driving current flowing through the first driving transistor T1A.

In the data writing period of the pixel circuit PC7, when the first selection signal SEL1 has the deactivated level and the second selection signal SEL2 has the activated level, the data voltage VDAT may be written to the gate of the second driving transistor T1B, a current path may be formed from the first power line PL1 to the second power line PL2 through the second driving transistor T1B, and the emission current flowing through the light-emitting element LED may be a second driving current flowing through the second driving transistor T1B.

In the data writing period of the pixel circuit PC7, when the first selection signal SEL1 has the activation level and the second selection signal SEL2 has the activation level, the data voltage VDAT may be written to the gate of each of the first and second driving transistors T1A and T1B, a current path through the first driving transistor T1A and a current path through the second driving transistor T1B may be formed from the first power line PL1 to the second power line PL2, and the emission current flowing through the light-emitting element LED may be the sum of the first driving current flowing through the first driving transistor T1A and the second driving current flowing through the second driving transistor T1B.

Figure 8:
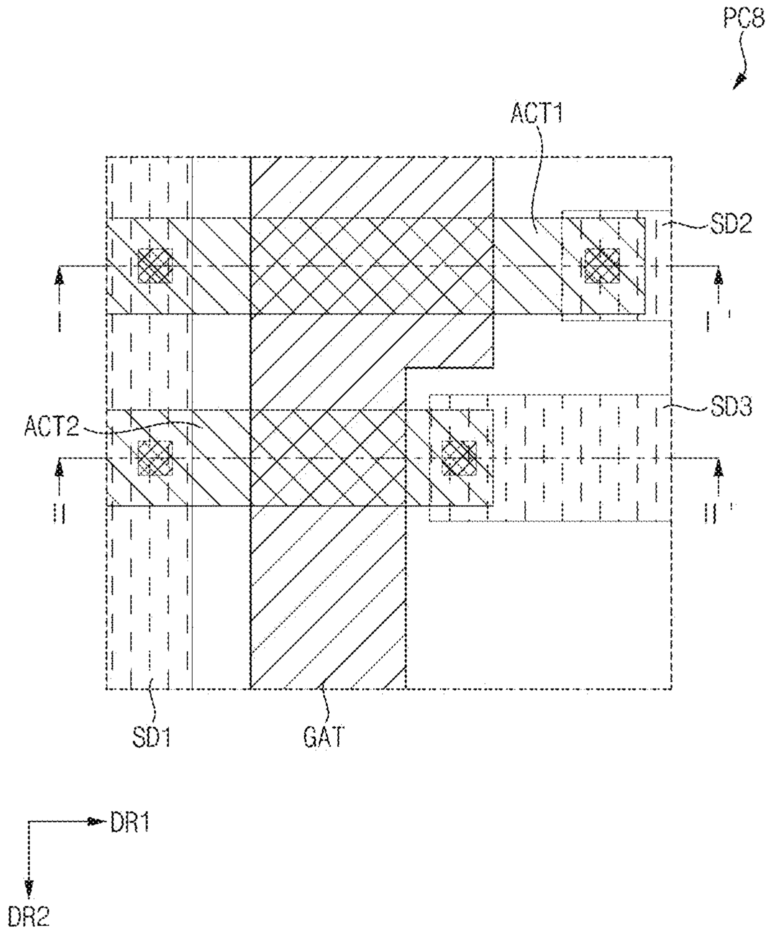
FIG. 8 is a plan view illustrating a portion of a pixel circuit according to an embodiment.
Figure 9:
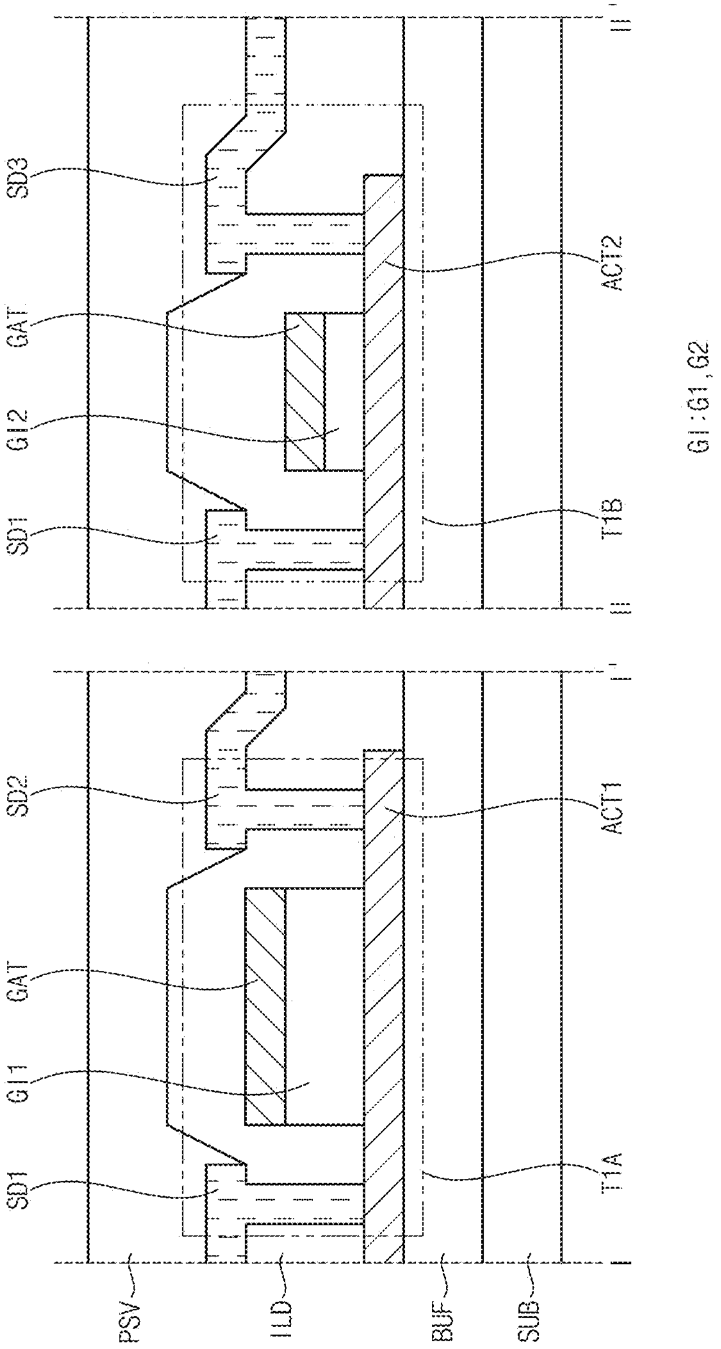
FIG. 9 is a cross-sectional view taken along a line I-I' and a line II-II' in FIG. 8.

FIG. 8 is a plan view illustrating a portion of a pixel circuit PC8 according to an embodiment. FIG. 9 is a cross-sectional view taken along a line I-I' and a line II-II' in FIG. 8.

Referring to FIGS. 8 and 9, in an embodiment, the pixel circuit PC8 may include a substrate SUB, a buffer layer BUF, a first active pattern ACT1, a second active pattern ACT2, a gate insulation layer GI, an upper gate pattern GAT, an interlayer insulation layer ILD, a first conductive pattern SD1, a second conductive pattern SD2, a third conductive pattern SD3, and a protective layer PSV.

The substrate SUB may include glass, plastic, or the like.

The buffer layer BUF may be positioned on the substrate SUB. The buffer layer BUF may include an inorganic insulation material such as silicon nitride, silicon oxide, or the like.

The first active pattern ACT1 and the second active pattern ACT2 may be positioned on the buffer layer BUF. The first active pattern ACT1 may extend in a first direction DR1 in a plan view or when viewed in a thickness direction of the substrate SUB. The second active pattern ACT2 may be arranged in (or directly on) a same layer as the first active pattern ACT1, and may extend in the first direction DR1 in the plan view. The first active pattern ACT1 and the second active pattern ACT2 may include a semiconductor material such as an oxide semiconductor.

A length of the first active pattern ACT1 in the first direction DR1 may be different from a length of the second active pattern ACT2 in the first direction DR1. In an embodiment, the length of the first active pattern ACT1 in the first direction DR1 may be greater than the length of the second active pattern ACT2 in the first direction DR1. In such an embodiment, the driving range of the first driving transistor T1A including the first active pattern ACT1 may be wider than the driving range of the second driving transistor T1B including the second active pattern ACT2.

A width of the first active pattern ACT1 in a second direction DR2 intersecting the first direction DR1 may be different from a width of the second active pattern ACT2 in the second direction DR2. In an embodiment, the width of the first active pattern ACT1 in the second direction DR2 may be less than the width of the second active pattern ACT2 in the second direction DR2. In such an embodiment, the driving range of the first driving transistor T1A including the first active pattern ACT1 may be wider than the driving range of the second driving transistor T1B including the second active pattern ACT2.

A semiconductor material of the first active pattern ACT1 may be different from a semiconductor material of the second active pattern ACT2. In an embodiment, the first active pattern ACT1 may include indium gallium zinc oxide (IGZO), and the second active pattern ACT2 may include an oxide semiconductor having a higher mobility than IGZO. In such an embodiment, the on-current of the second driving transistor T1B including the second active pattern ACT2 may be greater than the on-current of the first driving transistor T1A including the first active pattern ACT1.

The upper gate pattern GAT may be positioned on the first active pattern ACT1 and the second active pattern ACT2. The upper gate pattern GAT may include a metal such as molybdenum (Mo), titanium (Ti), or the like. The first driving transistor T1A may include the first active pattern ACT1 and a first portion (first upper gate) of the upper gate pattern GAT overlapping the first active pattern ACT1. The second driving transistor T1B may include the second active pattern ACT2 and a second portion (second upper gate) of the upper gate pattern GAT overlapping the second active pattern ACT2.

The gate insulation layer GI may be positioned between the first active pattern ACT1 and the upper gate pattern GAT and between the second active pattern ACT2 and the upper gate pattern GAT. The gate insulation layer GI may include an inorganic insulation material such as silicon nitride, silicon oxide, etc.

A thickness of a first portion GI1 of the gate insulation layer GI positioned between the first active pattern ACT1 and the upper gate pattern GAT may be different from a thickness of a second portion GI2 of the gate insulation layer GI positioned between the second active pattern ACT2 and the upper gate pattern GAT. In an embodiment, the thickness of the first portion GI1 of the gate insulation layer GI may be greater than the thickness of the second portion GI2 of the gate insulation layer GI. In such an embodiment, a distance between the first active pattern ACT1 and the first upper gate of the first driving transistor T1A may be greater than a distance between the second active pattern ACT2 and the second upper gate of the second driving transistor T1B, and the driving range of the first driving transistor T1A may be wider than the driving range of the second driving transistor T1B.

The interlayer insulation layer ILD may be positioned on the first active pattern ACT1, the second active pattern ACT2, and the upper gate pattern GAT. The interlayer insulation layer ILD may include an inorganic insulation material such as silicon nitride, silicon oxide, or the like.

The first conductive pattern SD1, the second conductive pattern SD2, and the third conductive pattern SD3 may be positioned on the interlayer insulation layer ILD. The first conductive pattern SD1, the second conductive pattern SD2, and the third conductive pattern SD3 may include a metal such as aluminum (Al), titanium (Ti), or the like.

The first conductive pattern SD1 may be connected to a first end of the first active pattern ACT1 (e.g., a first one of the drain and the source of the first driving transistor T1A) and a first end of the second active pattern ACT2 (e.g., a first one of the drain and the source of the second driving transistor T1B). The second conductive pattern SD2 may be connected to a second end of the first active pattern ACT1 (e.g., a second one of the drain and the source of the first driving transistor T1A). The third conductive pattern SD3 may be connected to a second end of the second active pattern ACT2 (e.g., a second one of the drain and the source of the second driving transistor T1B).

A protective layer PSV may be positioned on the first conductive pattern SD1, the second conductive pattern SD2, and the third conductive pattern SD3. The protective layer PSV may include an inorganic insulation material such as silicon nitride, silicon oxide, etc., and/or an organic insulation material such as polyimide.

Figure 10:
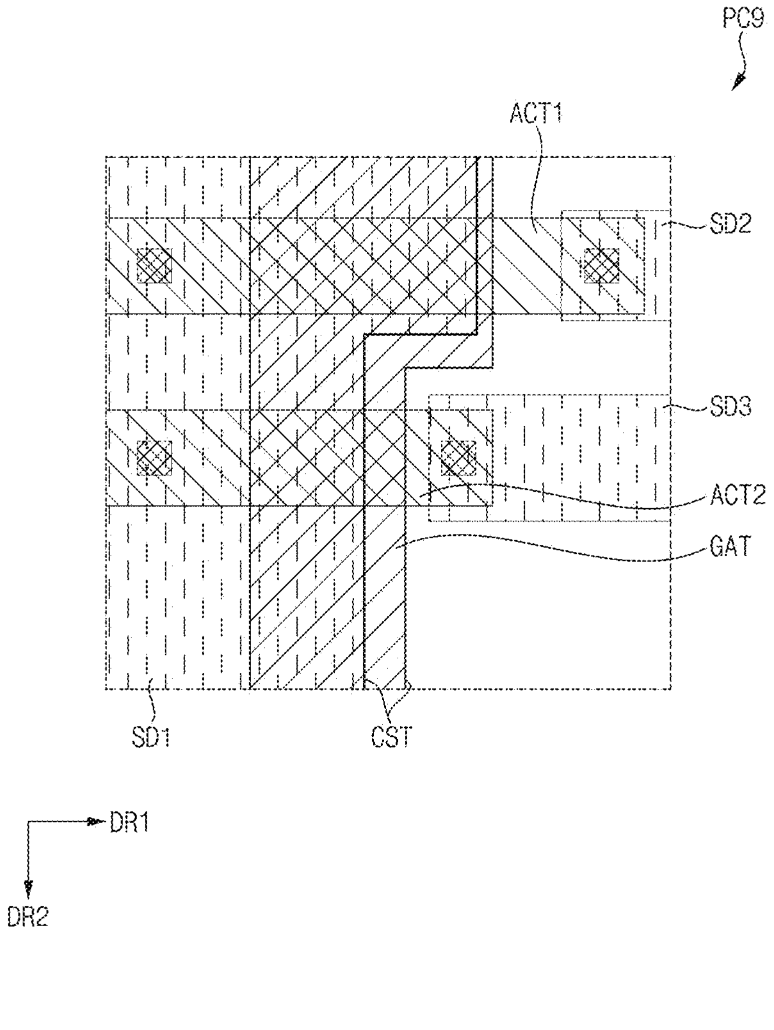
FIG. 10 is a plan view illustrating a portion of a pixel circuit according to an embodiment.

FIG. 10 is a plan view illustrating a portion of a pixel circuit PC9 according to an embodiment.

For convenience of description, any repetitive detailed descriptions of the same or like components of the pixel circuit PC9 shown in FIG. 10, which are substantially the same as or similar to those of the pixel circuit PC8 described above with reference to FIGS. 8 and 9, will be omitted.

Referring to FIG. 10, in an embodiment, the upper gate pattern GAT and the first conductive pattern SD1 may define a storage capacitor CST. The first conductive pattern SD1 may overlap at least a portion of a channel of the first active pattern ACT1 and at least a portion of a channel of the second active pattern ACT2.

Figure 11:
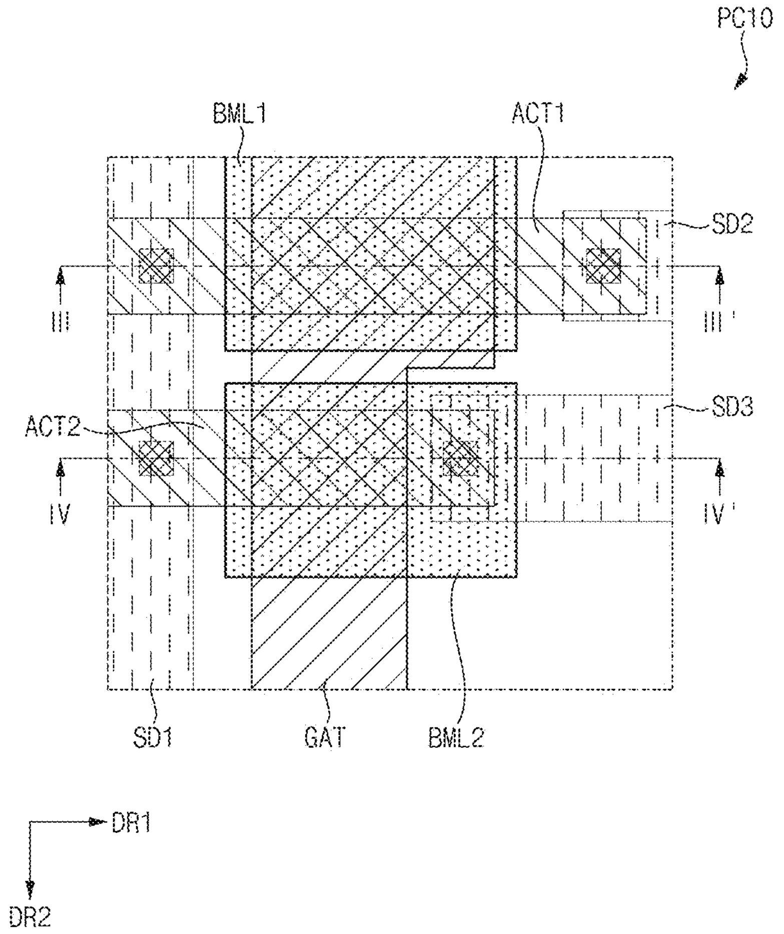
FIG. 11 is a plan view illustrating a portion of a pixel circuit according to an embodiment.
Figure 12:
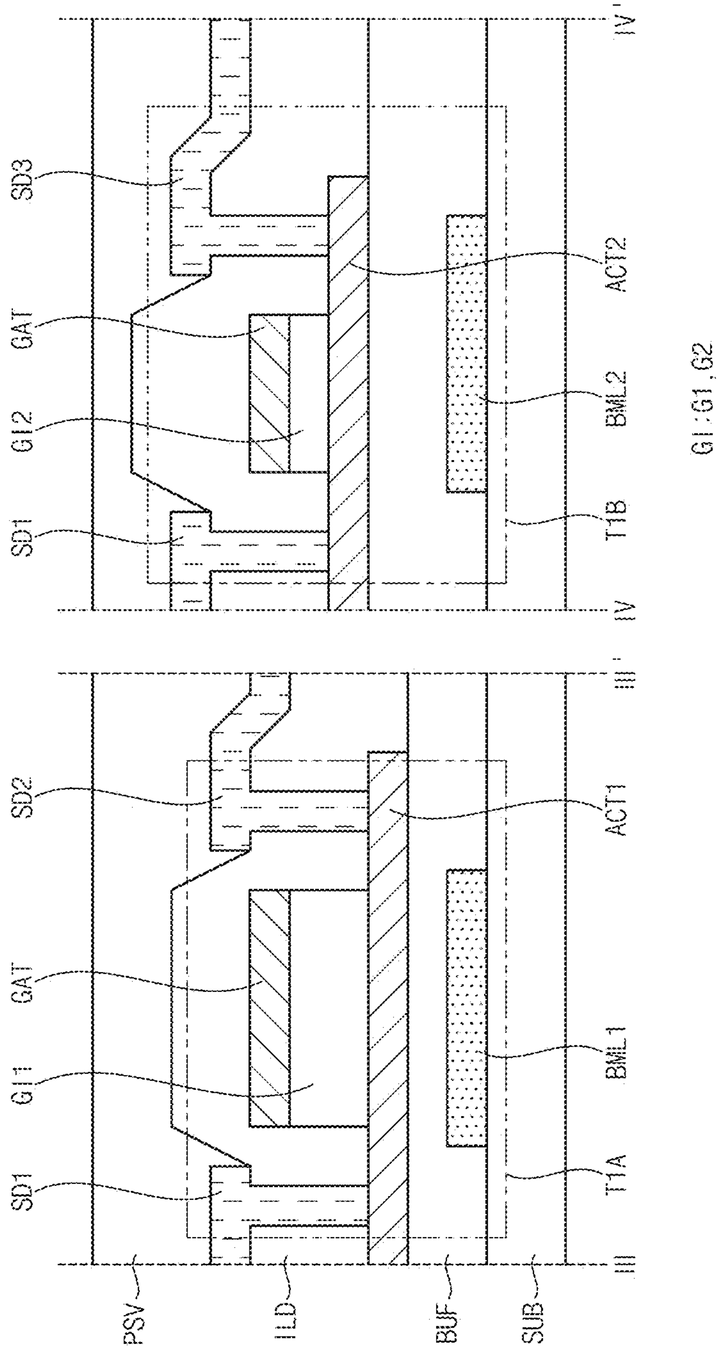
FIG. 12 is a cross-sectional view taken along a line III-III' and a line IV-IV' in FIG. 11.

FIG. 11 is a plan view illustrating a portion of a pixel circuit PC10 according to an embodiment. FIG. 12 is a cross-sectional view taken along a line III-III' and a line IV-IV' in FIG. 11.

For convenience of description, any repetitive detailed descriptions of the same or like components of the pixel circuit shown in FIGS. 11 and 12, which are substantially the same as or similar to those of the pixel circuit PC8 described above with reference to FIGS. 8 and 9, will be omitted.

Referring to FIGS. 11 and 12, in an embodiment, the pixel circuit PC10 may include a substrate SUB, a first lower gate pattern BML1, a second lower gate pattern BML2, a buffer layer BUF, a first active pattern ACT1, a second active pattern ACT2, a gate insulation layer GI, an upper gate pattern GAT, an interlayer insulation layer ILD, a first conductive pattern SD1, a second conductive pattern SD2, a third conductive pattern SD3, and a protective layer PSV.

The first lower gate pattern BML1 and the second lower gate pattern BML2 may be positioned between the substrate SUB and the buffer layer BUF. The first lower gate pattern BML1 and the second lower gate pattern BML2 may be arranged in (or directly on) a same layer as each other. The first lower gate pattern BML1 and the second lower gate pattern BML2 may include a metal such as molybdenum (Mo), titanium (Ti), or the like.

In an embodiment, a portion of the first lower gate pattern BML1 overlapping the first active pattern ACT1 may be a first lower gate of the first driving transistor T1A, and a portion of the second lower gate pattern BML2 overlapping the second active pattern ACT2 may be a second lower gate of the second driving transistor T1B. In such an embodiment, the first driving transistor T1A may include the first active pattern ACT1, a first portion (first upper gate) of the upper gate pattern GAT overlapping the first active pattern ACT1, and the portion (first lower gate) of the first lower gate pattern BML1 overlapping the first active pattern ACT1, and the second driving transistor T1B may include the second active pattern ACT2, a second portion (second upper gate) of the upper gate pattern GAT overlapping the second active pattern ACT2, and the portion (second lower gate) of the second lower gate pattern BML2 overlapping the second active pattern ACT2.

In an embodiment, a thickness of a first portion of the buffer layer BUF positioned between the first lower gate pattern BML1 and the first active pattern ACT1 may be different from a thickness of a second portion of the buffer layer BUF positioned between the second lower gate pattern BML2 and the second active pattern ACT2. Although FIG. 12 illustrates an embodiment in which the thickness of the first portion of the buffer layer BUF is less than the thickness of the second portion of the buffer layer BUF, the present disclosure is not limited thereto, and in another embodiment, the thickness of the first portion of the buffer layer BUF may be greater than the thickness of the second portion of the buffer layer BUF.

Figure 13:
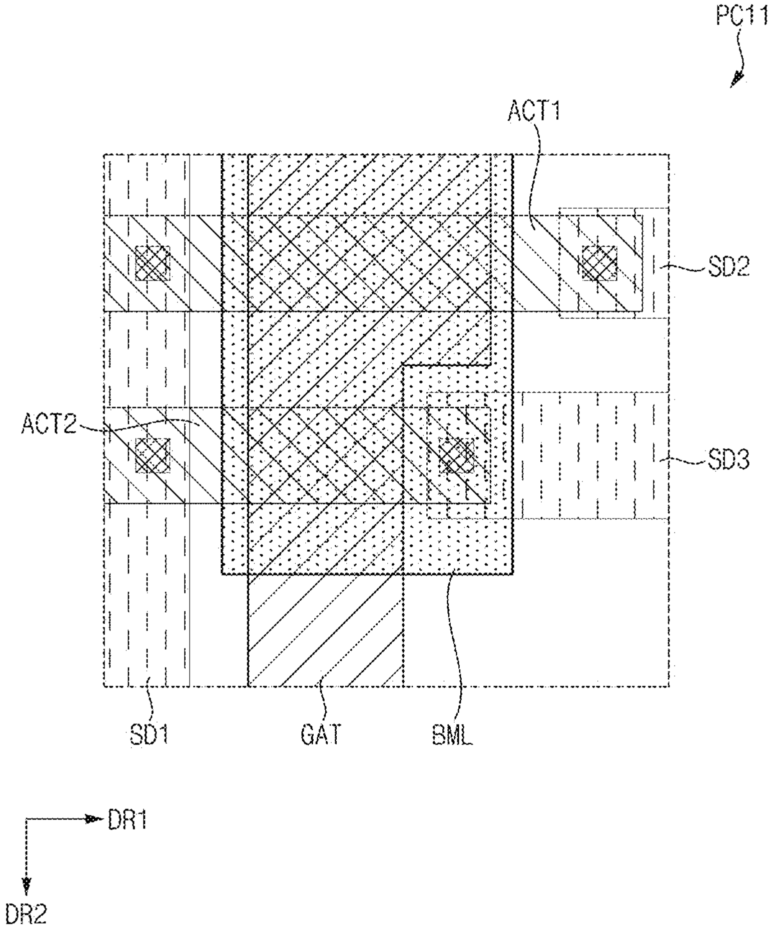
FIG. 13 is a plan view illustrating a portion of a pixel circuit according to an embodiment.

FIG. 13 is a plan view illustrating a portion of a pixel circuit PC11 according to an embodiment.

For convenience of description, any repetitive detailed descriptions of the same or like components of the pixel circuit PC11 shown in FIG. 13, which are substantially the same as or similar to those the pixel circuit PC10 described above with reference to FIGS. 11 and 12, will be omitted.

Referring to FIG. 13, in an embodiment, the pixel circuit PC11 may include a substrate, a lower gate pattern BML, a buffer layer, a first active pattern ACT1, a second active pattern ACT2, a gate insulation layer, an upper gate pattern GAT, an interlayer insulation layer, a first conductive pattern SD1, a second conductive pattern SD2, a third conductive pattern SD3, and a protective layer.

The lower gate pattern BML may be positioned between the substrate and the buffer layer. The lower gate pattern BML may include a metal such as molybdenum (Mo), titanium (Ti), etc.

In an embodiment, a portion of the lower gate pattern BML overlapping the first active pattern ACT1 may be a first lower gate of the first driving transistor T1A, and a portion of the lower gate pattern BML overlapping the second active pattern ACT2 may be a second lower gate of the second driving transistor T1B. In such an embodiment, the first lower gate of the first driving transistor T1A and the second lower gate of the second driving transistor T1B may be integrally formed with each other as a single unitary indivisible part.

Figure 14:
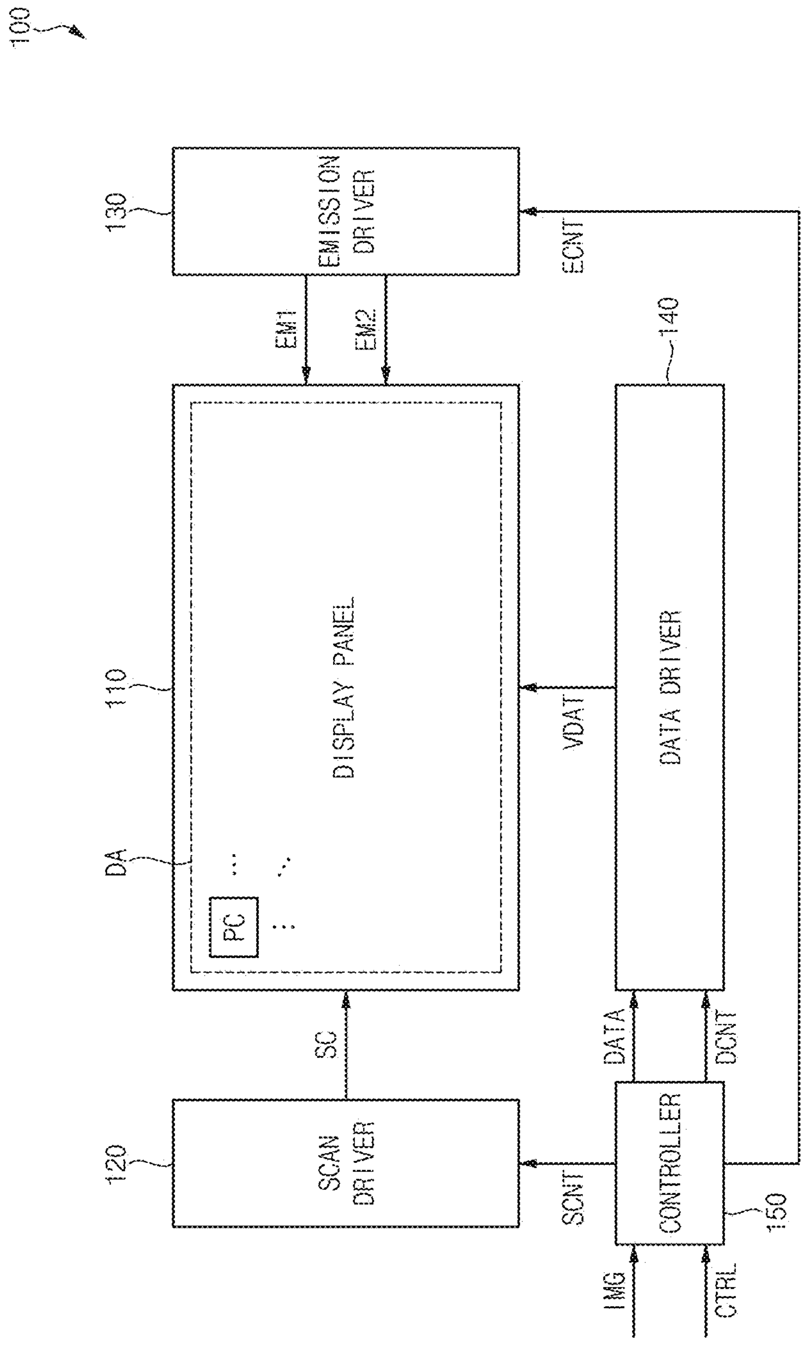
FIG. 14 is a block diagram illustrating a display device according to an embodiment.

FIG. 14 is a block diagram illustrating a display device 100 according to an embodiment.

Referring to FIG. 14, an embodiment of the display device 100 may include a display panel 110 and a panel driver. The display panel 110 may include a plurality of pixel circuits PC arranged in a display area DA. The display area DA may be an area where an image is displayed from the display panel 110. Each of the pixel circuits PC may correspond to any one of the pixel circuits PC1-PC11 described with reference to FIGS. 1 to 13.

The panel driver may drive the display panel 110. The panel driver may include a scan driver 120, an emission driver 130, a data driver 140, and a controller 150.

The scan driver 120 may provide scan signals SC to the pixel circuits PC. The scan driver 120 may generate the scan signals SC based on a scan control signal SCNT. The scan control signal SCNT may include a scan start signal, a scan clock signal, etc.

The emission driver 130 may provide first emission signals EM1 and second emission signals EM2 to the pixel circuits PC. The emission driver 130 may generate the first emission signals EM1 and the second emission signals EM2 based on an emission control signal ECNT. The emission control signal ECNT may include an emission start signal, an emission clock signal, etc.

The data driver 140 may provide data voltages VDAT to the pixel circuits PC. The data driver 140 may generate the data voltages VDAT based on a data signal DATA and a data control signal DCNT. The data driver 140 may convert the digital data signal DATA into the analog data voltage VDAT. The data control signal DCNT may include a load signal, a data clock signal, etc.

The controller 150 may control an operation of the scan driver 120, an operation of the emission driver 130, and an operation of the data driver 140. The controller 150 may provide the scan control signal SCNT to the scan driver 120, may provide the emission control signal ECNT to the emission driver 130, and may provide the data signal DATA and the data control signal DCNT to the data driver 140. The controller 150 may generate the scan control signal SCNT, the emission control signal ECNT, the data signal DATA, and the data control signal DCNT based on image data IMG and a controller control signal CTRL. The controller 150 may convert the image data IMG into the data signal DATA. The controller control signal CTRL may include a master clock signal, a vertical synchronization signal, a horizontal synchronization signal, a data enable signal, etc.

Figure 15:
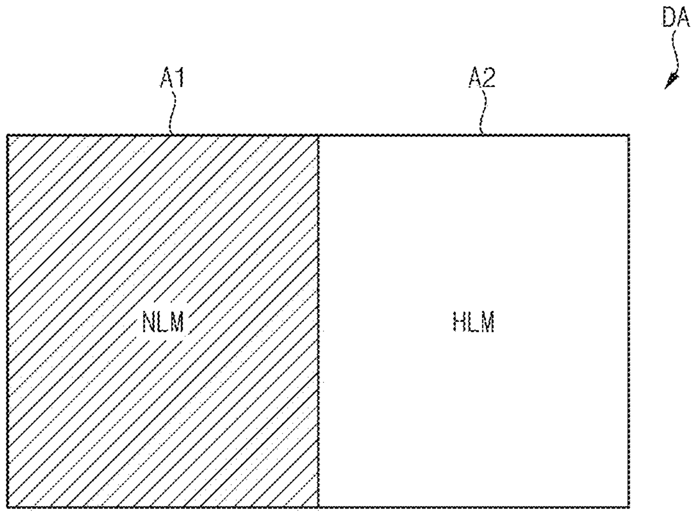
FIG. 15 is a plan view illustrating an example of a display area of FIG. 14.

FIG. 15 is a plan view illustrating an example of the display area DA of FIG. 14.

Referring to FIGS. 14 and 15, in an embodiment, the display area DA may include a first area A1 and a second area A2. The first area A1 may operate in a normal luminance mode NLM, and the second area A2 may operate in a high luminance mode HLM. An emission current of the pixel circuit PC positioned in the first area A1 among the pixel circuits PC may be a first driving current, and the emission current of the pixel circuit PC positioned in the second area A2 among the pixel circuits PC may be a second driving current or the sum of the first driving current and the second driving current. The emission current may be a current flowing through the light-emitting element LED of FIGS. 1 to 7, the first driving current may be a current flowing through the first driving transistor T1A of FIGS. 1 to 7, and the second driving current may be a current flowing through the second driving transistor T1B of FIGS. 1 to 7.

The first area A1 and the second area A2 may be variable areas (or variably determined areas) depending on a state of the display area DA. In an embodiment, the second area A2 may be an area of the display area DA into which strong external light, such as sunlight, is incident, and the first area A1 may be an area into which the strong external light is not incident. Accordingly, the first area A1 may operate in the normal luminance mode NLM to express detailed grayscale in the first area A1, and the second area A2 may operate in the high luminance mode HLM to reduce power consumption in the second area A2.

Figure 16:
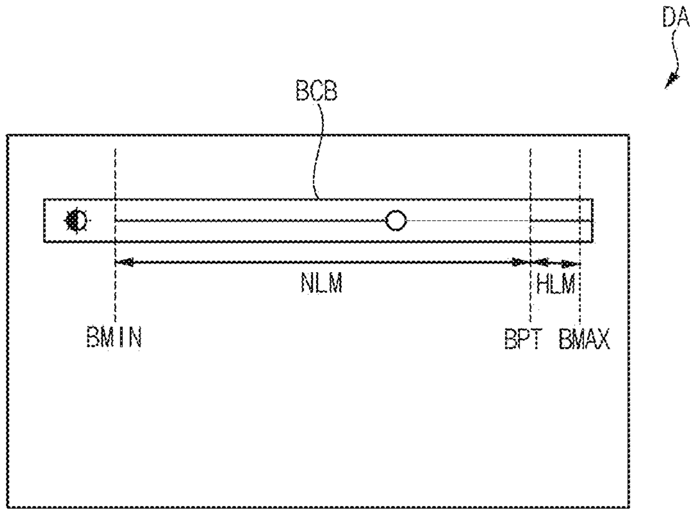
FIG. 16 is a plan view illustrating an example of a display area of FIG. 14.

FIG. 16 is a plan view illustrating an example of the display area DA of FIG. 14.

Referring to FIGS. 14 and 16, in an embodiment, a brightness control bar BCB may be displayed in the display area DA, and a user may control brightness (luminance) of the display area DA using the brightness control bar BCB. When the user controls the brightness of the display area DA between a minimum brightness BMIN and a specific brightness BPT, the pixel circuits PC may operate in the normal luminance mode NLM, and the emission current of each of the pixel circuits PC may be the first driving current. When the user controls the brightness of the display area DA between the specific brightness BPT and a maximum brightness BMAX, the pixel circuits PC may operate in the high luminance mode HLM, and the emission current of each of the pixel circuits PC may be the second driving current or the sum of the first driving current and the second driving current.

Figure 17:
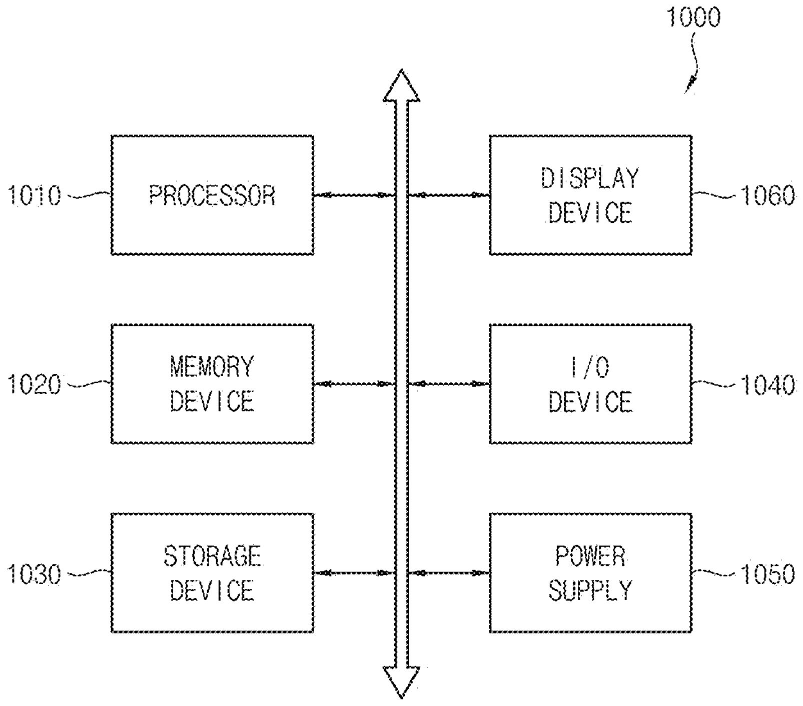
FIG. 17 is a block diagram illustrating an electronic apparatus according to an embodiment.

FIG. 17 is a block diagram illustrating an electronic apparatus 1000 according to an embodiment.

Referring to FIG. 17, an embodiment of the electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. In an embodiment, the processor 1010 may be a microprocessor, a central processing unit (CPU), or the like. The processor 1010 may be connected to other components through an address bus, a control bus, a data bus, or the like. In an embodiment, the processor 1010 may also be connected to an expansion bus such as a peripheral component interconnect (PCI) bus. In an embodiment, the processor 1010 may generate the image data IMG of FIG. 14 and the controller control signal CTRL of FIG. 14, and may provide the image data IMG and the controller control signal CTRL to the display device 1060.

The memory device 1020 may store data required for an operation of the electronic apparatus 1000. In an embodiment, for example, the memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, or the like. The I/O device 1040 may include: an input device such as a keyboard, a keypad, a touch pad, a touch screen, or a mouse; and an output device such as a speaker or a printer. The power supply 1050 may supply a power required for the operation of the electronic apparatus 1000. The display device 1060 may be connected to other components through the buses or other communication links. The display device 1060 may correspond to the display device 100 of FIG. 14.

In a pixel circuit included in the display device 1060, a first driving current flowing through a first driving transistor flows through a light-emitting element in a normal luminance mode, such that detailed grayscale expression may be enabled in a low luminance. Further, a second driving current flowing through a second driving transistor or a sum of the first driving current and the second driving current flows through the light-emitting element in a high luminance mode, so that power consumption may be reduced in a high luminance.

The display device according to the embodiments may be applied to a display device included in a computer, a notebook, a mobile phone, a smart phone, a smart pad, a smart watch, a portable media player (PMP), a personal digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:
a light-emitting element connected between a first power line and a second power line;
a first driving transistor connected between the first power line and the light-emitting element; and
a second driving transistor connected between the first power line and the light-emitting element,
wherein an emission current flowing through the light-emitting element is a first driving current flowing through the first driving transistor, a second driving current flowing through the second driving transistor, or a sum of the first driving current and the second driving current, and
wherein a driving range of the first driving transistor is wider than a driving range of the second driving transistor, and an on-current of the second driving transistor is greater than an on-current of the first driving transistor.

2. The pixel circuit of claim 1, wherein a first one of the first and second driving transistors includes only one gate, and
wherein a second one of the first and second driving transistors includes two gates.

3. The pixel circuit of claim 1, wherein each of the first and second driving transistors includes a first gate and a second gate,
wherein a data voltage is applied to the first gate of each of the first and second driving transistors,
wherein the second gate of the first driving transistor is connected to a source of the first driving transistor, and
wherein the second gate of the second driving transistor is connected to the first gate of the second driving transistor.

4. The pixel circuit of claim 1, further comprising:
a first emission control transistor connected between the first power line and the first driving transistor, wherein the first emission control transistor is turned on in response to a first emission signal; and
a second emission control transistor connected between the first power line and the second driving transistor, wherein the second emission control transistor is turned on in response to a second emission signal.

5. The pixel circuit of claim 1, further comprising:
a first emission control transistor connected between the first driving transistor and the light-emitting element, wherein the first emission control transistor is turned on in response to a first emission signal; and
a second emission control transistor connected between the second driving transistor and the light-emitting element, wherein the second emission control transistor is turned on in response to a second emission signal.

6. The pixel circuit of claim 1, further comprising:
a storage capacitor including a terminal connected to a first node; and
a scan transistor connected between a data line and the first node, wherein the scan transistor is turned on in response to a scan signal.

7. The pixel circuit of claim 6, further comprising:
a second connection transistor connected between the first node and a gate of the second driving transistor, wherein the second connection transistor is turned on in response to a second selection signal.

8. The pixel circuit of claim 7, further comprising:
a first connection transistor connected between the first node and a gate of the first driving transistor, wherein the first connection transistor is turned on in response to a first selection signal.

9. The pixel circuit of claim 1, further comprising:
a substrate;
a first active pattern on the substrate, wherein the first active pattern extends in a first direction in a plan view;
a second active pattern in a same layer as the first active pattern, wherein the second active pattern extends in the first direction in the plan view; and
an upper gate pattern on the first active pattern and the second active pattern,
wherein the first driving transistor includes the first active pattern and a first portion of the upper gate pattern which overlaps the first active pattern, and
wherein the second driving transistor includes the second active pattern and a second portion of the upper gate pattern which overlaps the second active pattern.

10. The pixel circuit of claim 9, wherein a length of the first active pattern in the first direction is different from a length of the second active pattern in the first direction.

11. The pixel circuit of claim 9, wherein a width of the first active pattern in a second direction intersecting the first direction is different from a width of the second active pattern in the second direction.

12. The pixel circuit of claim 9, wherein a semiconductor material of the first active pattern is different from a semiconductor material of the second active pattern.

13. The pixel circuit of claim 9, further comprising:
a gate insulation layer between the first active pattern and the upper gate pattern and between the second active pattern and the upper gate pattern,
wherein a thickness of a first portion of the gate insulation layer which is positioned between the first active pattern and the upper gate pattern is different from a thickness of a second portion of the gate insulation layer which is positioned between the second active pattern and the upper gate pattern.

14. The pixel circuit of claim 9, further comprising:
a buffer layer between the substrate and the first active pattern and between the substrate and the second active pattern,
wherein the first driving transistor further includes a first lower gate between the substrate and buffer layer and overlapping the first active pattern, and
wherein the second driving transistor further includes a second lower gate between the substrate and buffer layer and overlapping the second active pattern.

15. The pixel circuit of claim 14, wherein a thickness of a first portion of the buffer layer positioned between the first lower gate and the first active pattern is different from a thickness of a second portion of the buffer layer positioned between the second lower gate and the second active pattern.

16. The pixel circuit of claim 14, wherein the first lower gate and the second lower gate are integrally formed with each other as a single unitary indivisible part.

17. The pixel circuit of claim 9, further comprising:
a conductive pattern on the upper gate pattern, wherein the conductive pattern is connected to a terminal of the first active pattern and a terminal of the second active pattern,
wherein the upper gate pattern and the conductive pattern collectively define a storage capacitor.

18. A display device comprising:

a display panel including a plurality of pixel circuits positioned in a display area; and a panel driver which drives the display panel, wherein each of the pixel circuits comprises:

a light-emitting element connected between a first power line and a second power line;

a first driving transistor connected between the first power line and the light-emitting element; and a second driving transistor connected between the first power line and the light-emitting element, and wherein an emission current flowing through the light-emitting element is a first driving current flowing through the first driving transistor, a second driving current flowing through the second driving transistor, or a sum of the first driving current and the second driving current, and wherein a driving range of the first driving transistor is wider than a driving range of the second driving transistor, and an on-current of the second driving transistor is greater than an on-current of the first driving transistor.

19. The display device of claim 18, wherein the emission current of a pixel circuit positioned in a first area of the display area among the pixel circuits is the first driving current, and wherein the emission current of a pixel circuit positioned in a second area of the display area among the pixel circuits is the second driving current or the sum of the first driving current and the second driving current.

20. An electronic apparatus comprising:

a processor which generates image data; and a display device which displays an image based on the image data, wherein the display device comprises, a display panel including a plurality of pixel circuits positioned in a display area; and a panel driver which drives the display panel, wherein each of the pixel circuits comprises:

a light-emitting element connected between a first power line and a second power line;

a first driving transistor connected between the first power line and the light-emitting element; and a second driving transistor connected between the first power line and the light-emitting element, and wherein an emission current flowing through the light-emitting element is a first driving current flowing through the first driving transistor, a second driving current flowing through the second driving transistor, or a sum of the first driving current and the second driving current, and wherein a driving range of the first driving transistor is wider than a driving range of the second driving transistor, and an on-current of the second driving transistor is greater than an on-current of the first driving transistor.

* * * * *